United States Patent
Itaya et al.

(10) Patent No.: US 8,852,799 B2
(45) Date of Patent: Oct. 7, 2014

(54) NON-AQUEOUS ELECTROLYTE SECONDARY BATTERY

(75) Inventors: Masaharu Itaya, Kyoto (JP); Hideyuki Koga, Bordeaux (FR); Kumiko Kanai, Osaka (JP); Takao Inoue, Aichi (JP); Masahisa Fujimoto, Osaka (JP)

(73) Assignee: C/O Intellectual Property H.Q., Sanyo Electric Co., Ltd., Moriguchi-chi (JP)

( * ) Notice: Subject to any disclaimer, the term of this patent is extended or adjusted under 35 U.S.C. 154(b) by 1796 days.

(21) Appl. No.: 11/991,558

(22) PCT Filed: Sep. 4, 2006

(86) PCT No.: PCT/JP2006/317482
§ 371 (c)(1),
(2), (4) Date: Sep. 25, 2009

(87) PCT Pub. No.: WO2007/029659
PCT Pub. Date: Mar. 15, 2007

(65) Prior Publication Data
US 2010/0009254 A1  Jan. 14, 2010

(30) Foreign Application Priority Data

Sep. 8, 2005  (JP) .................................. 2005-261160

(51) Int. Cl.
| | |
|---|---|
| H01M 10/054 | (2010.01) |
| H01M 10/052 | (2010.01) |
| H01M 4/58 | (2010.01) |
| H01M 4/134 | (2010.01) |
| H01M 4/02 | (2006.01) |
| H01M 10/0566 | (2010.01) |

(52) U.S. Cl.
CPC ............ *H01M 4/134* (2013.01); *H01M 10/052* (2013.01); *H01M 10/054* (2013.01); *Y02E 60/122* (2013.01); *H01M 4/58* (2013.01); *H01M 2004/028* (2013.01); *H01M 10/0566* (2013.01)
USPC ......................................... 429/188; 429/223

(58) Field of Classification Search
USPC ........... 429/209, 212, 218.1–218.2, 223–224, 429/231.1, 231.5, 231.9, 231.95; 29/623.1
See application file for complete search history.

(56) References Cited

U.S. PATENT DOCUMENTS 5,051,325 A   9/1991  Shishikura et al. ............ 429/197
5,965,293 A * 10/1999  Idota et al. .................. 429/218.1

(Continued)

FOREIGN PATENT DOCUMENTS

CN  1630126 A  6/2005
JP  2-30069  1/1990

(Continued)

OTHER PUBLICATIONS

Y. Takahashi, et al.; "Layered transition metal oxides as cathodes for sodium secondary battery;" *The 45th Battery Symposium Report;* 2004; pp. 268-269 (1 Sheet)/Abstract.

*Primary Examiner* — Barbara Gilliam
*Assistant Examiner* — Stephan Essex
(74) *Attorney, Agent, or Firm* — Kratz, Quintos & Hanson, LLP

(57) ABSTRACT

An object of the invention is to provide an inexpensive non-aqueous electrolyte secondary battery that allows reversible charge and discharge to be carried out and can be used for a long period because of a stable non-aqueous electrolyte used therein. The invention provides a non-aqueous electrolyte secondary battery including a positive electrode including a positive electrode active material and capable of storing and releasing sodium, a negative electrode capable of storing and releasing sodium, and a non-aqueous electrolyte, and the positive electrode active material includes sodium, nickel, manganese, and a transition metal that can exist in a hexavalent state. An example of the transition metal that can exist in a hexavalent state may include tungsten (W). An example of the negative electrode may include a sodium metal capable of storing and releasing sodium ions.

5 Claims, 4 Drawing Sheets

(56) References Cited

U.S. PATENT DOCUMENTS

| | | |
|---|---|---|
| 6,319,633 B1 * | 11/2001 | Ikeda et al. ............... 429/231.95 |
| 7,041,239 B2 * | 5/2006 | Barker et al. ............... 252/521.5 |
| 2002/0142221 A1 * | 10/2002 | Nemoto et al. ............... 429/223 |
| 2002/0192553 A1 | 12/2002 | Barker et al. ............... 429/224 |
| 2004/0191628 A1 | 9/2004 | Inoue et al. |
| 2006/0166091 A1 * | 7/2006 | Deguchi et al. ............... 429/199 |
| 2006/0257743 A1 * | 11/2006 | Kuratomi et al. ............ 429/223 |

FOREIGN PATENT DOCUMENTS

| | | |
|---|---|---|
| JP | 11-40156 | 2/1999 |
| JP | 2003-151549 | 5/2003 |
| JP | 3439082 B2 | 8/2003 |
| JP | 2004-288579 | 10/2004 |

\* cited by examiner

F I G. 1
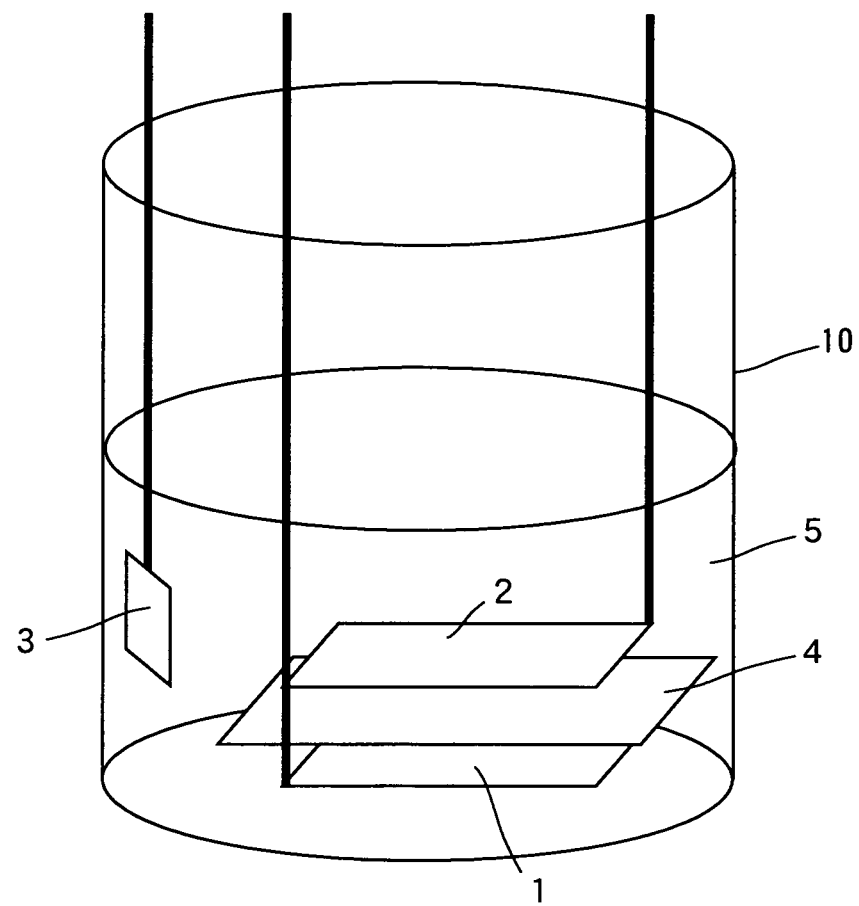

NON-AQUEOUS ELECTROLYTE SECONDARY BATTERY

TECHNICAL FIELD

The present invention relates to a non-aqueous electrolyte secondary battery including a positive electrode, a negative electrode, and a non-aqueous electrolyte.

BACKGROUND ART

Today, non-aqueous electrolyte secondary batteries are in wide use as secondary batteries with high energy density. In such a non-aqueous electrolyte secondary battery, for example, lithium ions are transferred between a positive electrode and a negative electrode to carry out charge and discharge.

In such a non-aqueous electrolyte secondary battery in general, a composite oxide of lithium transition metals having a layered structure of lithium nickelate ($LiNiO_2$), lithium cobaltate ($LiCoO_2$) or the like is used as the positive electrode, and a carbon material capable of storing and releasing lithium, a lithium metal, a lithium alloy, or the like is used as the negative electrode (see, for example, Patent Document 1).

The use of the non-aqueous electrolyte secondary battery allows a discharge capacity of 150 mAh/g to 180 mAh/g, a potential of about 4 V, and a theoretical capacity of about 260 mAh/g to be obtained.

The non-aqueous electrolyte produced by dissolving an electrolyte salt such as lithium tetrafluoroborate ($LiBF_4$) and lithium hexafluorophosphate ($LiPF_6$) in an organic solvent such as ethylene carbonate and diethyl carbonate is used.

However, such a non-aqueous electrolyte secondary battery with lithium ions is costly.

Therefore, researches on non-aqueous electrolyte secondary batteries using sodium ions supplied in abundance from seawater instead of lithium ions have recently been started. The use of sodium abundant in supply as a resource allows non-aqueous electrolyte secondary batteries to be provided less costly.

Examples of researches on such a non-aqueous electrolyte secondary battery using sodium ions are very limited in number, among which a battery that uses sodium ferrite ($NaFeO_2$) for a positive electrode and sodium perchlorate ($NaClO_4$) as a peroxide for a negative electrode has been proposed (see for example Non-patent Document 1).

[Patent Document 1] JP 2003-151549 A

[Non-patent Document 1] The 45th Battery Symposium, Abstract Volume, pp. 268-269

DISCLOSURE OF THE INVENTION

Problems to be Solved by the Invention

In the above-described conventional non-aqueous electrolyte secondary battery using sodium ions, however, the non-aqueous electrolyte is less stable, and it would difficult to use the non-aqueous electrolyte for a long period of time.

Means for Solving the Problems

An object of the invention is to provide an inexpensive non-aqueous electrolyte secondary battery that allows reversible charge and discharge to be carried out and can be used for a long period because of stable non-aqueous electrolyte used therein.

A non-aqueous electrolyte secondary battery according to one aspect of the invention includes a positive electrode including a positive electrode active material and capable of storing and releasing sodium, a negative electrode capable of storing and releasing sodium, and a non-aqueous electrolyte, and the positive electrode active material contains sodium, nickel, manganese, and a transition metal that can be in a hexavalent state.

With respect to the non-aqueous electrolyte secondary battery, in the crystal structure of the positive electrode active material including sodium, nickel, manganese, and a transition metal that can be in a hexavalent state, if part of manganese at the nickel site is replaced by the transition metal that can be in the hexavalent state, the amount of nickel increases. In this way, the valence of nickel is tetravalent or less even if all the sodium ions are released from the positive electrode. As a result, it is expected that even if sodium ions are released until a high potential is reached, the crystal structure of the positive electrode active material is stabilized and the thermal stability is also improved.

The structure and functions described above allows reversible charge and discharge to be carried out, and if a stable non-aqueous electrolyte is used, the electrolyte can be used for a long period. The use of sodium supplied in abundance as a resource allows non-aqueous electrolyte secondary batteries to be provided less costly.

The transition metal may be tungsten. In this case, the crystal structure of the positive electrode active material is more stabilized, and the thermal stability is improved, which allows good charge/discharge to be carried out.

The composition of the positive electrode active material is preferably represented by the molar ratio of the total of sodium (Na) and lithium (Li), nickel (Ni), manganese (Mn), and tungsten (W) as $(Na+\alpha Li):Ni:Mn:W=x:4:y:z$, where it is preferable that x is from 4 to 12, y is from 0.1 to 1.5, z is from 0.1 to 1.5, and a is at least 0 and less than 1. With the composition of the positive electrode active material, the crystal structure of the positive electrode active material is even more stabilized, which allows better charge and discharge to be carried out.

The non-aqueous electrolyte may include one or more selected from the group consisting of a cyclic carbonate, a chain carbonate, esters, cyclic ethers, chain ethers, nitriles, and amides. In this case, the cost can be reduced and the stability is improved.

Effects of the Invention

According to the invention, the use of a stable non-aqueous electrolyte that enables reversible charge and discharge allows the electrolyte to be used for a long period, and the use of sodium supplied in abundance as a resource allows non-aqueous electrolyte secondary batteries to be provided less costly.

BRIEF DESCRIPTION OF THE DRAWINGS

FIG. 1 is a schematic view for use in illustrating a test cell for a non-aqueous electrolyte secondary battery according to an embodiment.

BEST MODE FOR CARRYING OUT THE INVENTION

Figure 2:
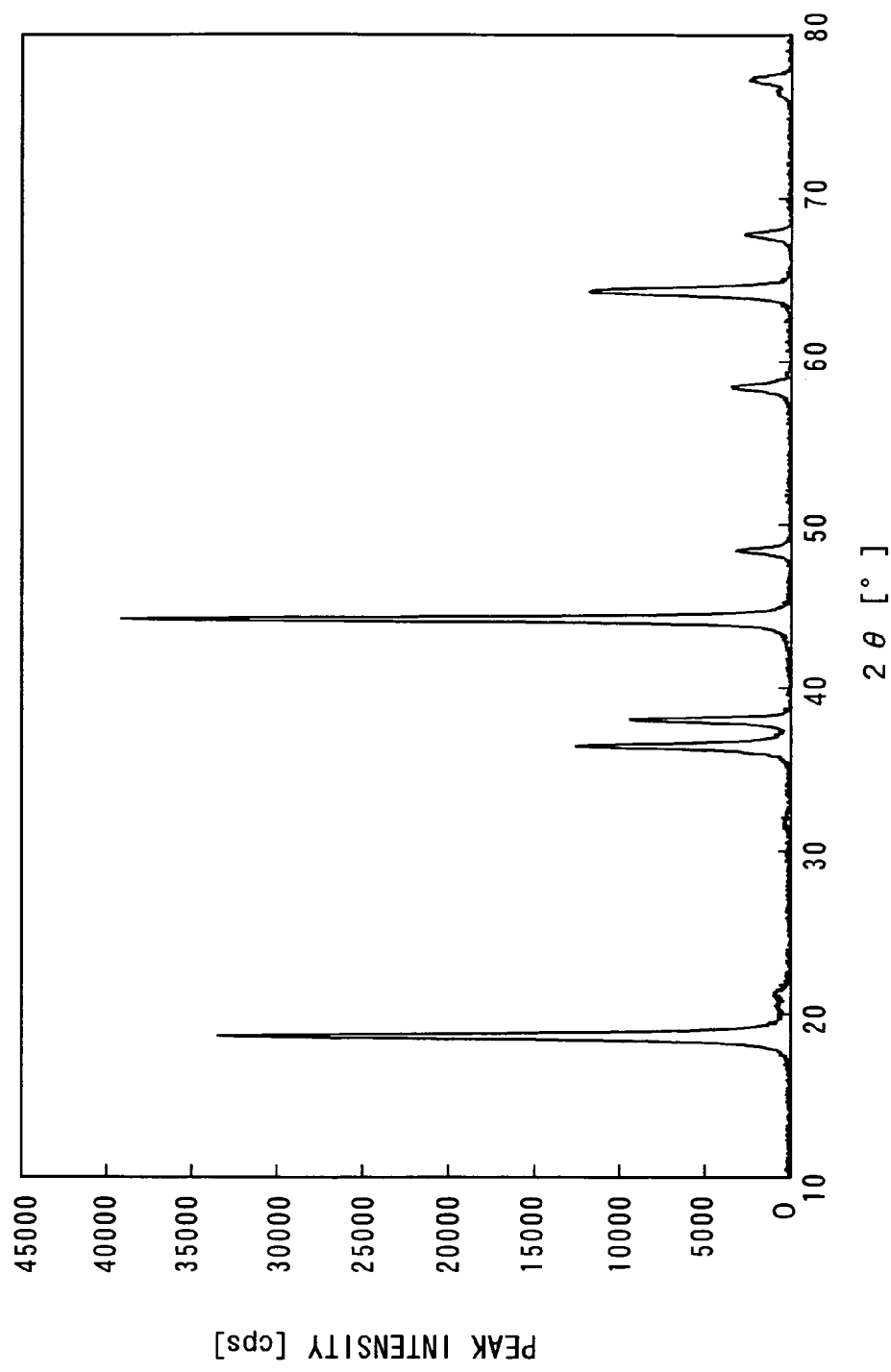
FIG. 2 is a graph showing measurement results of XRD measurement carried out to a positive electrode active material.

Now, a non-aqueous electrolyte secondary battery according to an embodiment of the present invention will be described in detail with reference to the accompanying drawings.

The non-aqueous electrolyte secondary battery according to the embodiment includes a working electrode (hereinafter referred to as "positive electrode"), a counter electrode (hereinafter referred to as "negative electrode"), and a non-aqueous electrolyte.

Note that the materials, and the thickness, the concentrations and the like of these materials are not limited to those in the following description and may be set as required.

(1) Fabrication of Positive Electrode

The positive electrode active material according to the embodiment includes sodium (Na), nickel (Ni), manganese (Mn), and a transition metal that can be in a hexavalent state.

An example of such a transition metal that can be in a hexavalent state may include at least one of tungsten (W), molybdenum (Mo), and chromium (Cr).

Tungsten and molybdenum are transition metals that are structurally the most stable in the hexavalent state which is the maximum valence that could be obtained. If any of these transition metals each in a hexavalent state is in the crystal structure of the positive electrode active material, the crystal structure of the positive electrode active material would effectively be stabilized.

Part of manganese at the nickel site is replaced by a transition metal that can be in a hexavalent state. In this way, the valence of the nickel can be changed from trivalent to bivalent that offers more stability. As a result, a reaction of the valence of nickel from bivalent to tetravalent can be used during charge and discharge.

In this way, $LiNi_{0.5}Mn_{0.5}O_2$ is used as such a positive electrode active material whose reaction that changes the valence of nickel from to bivalent to tetravalent is taken advantage of. The valence of the nickel is bivalent and the valence of the manganese is tetravalent in the positive electrode active material, and during charge and discharge, the manganese maintains its stable tetravalent state and the valence of the nickel changes from bivalent to tetravalent.

In the above-described positive electrode active material, $LiNi_{0.5}Mn_{0.5}O_2$, if part of manganese at the nickel site is replaced by a transition metal that can be in a hexavalent state, the amount of nickel increases and the valence of the nickel is not more than tetravalent if all the sodium ions are released. As a result, it is believed that if sodium ions are released until a high potential is reached, the crystal structure of the positive electrode active material is stabilized and the thermal stability is improved.

According to the embodiment, the positive electrode active material preferably includes all of sodium, nickel, manganese, and the transition metal that can be in a hexavalent state.

In a preferable example of the composition of the positive electrode active material including all these constituents, the molar ratio of the total of sodium (Na) and lithium (Li):nickel (Ni): manganese (Mn): tungsten (W) is represented by the following formula:

$$(Na+\alpha Li):Ni:Mn:W = x:4:y:z \quad (1)$$

where $4 \leq x \leq 12$, $0.1 \leq y \leq 1.5$, $0.1 \leq z \leq 1.5$, and $0 \leq \alpha < 1$.

A conducting agent to be added in order to produce a positive electrode does not have to be particularly highly conductive, but if a positive electrode active material with low conductivity is used, the conducting agent is preferably added.

Such a conducting agent needs only be a conductive material, and at least one of oxide, carbide, nitride, and a carbon material having particularly high conductivity may be used.

Examples of the oxide having high conductivity may include tin oxide and indium oxide. Examples of the carbide having high conductivity may include titanium carbide (TiC), tantalum carbide (TaC), niobium carbide (NbC), and tungsten carbide (WC).

Examples of the nitride having high conductivity may include titanium nitride (TiN), tantalum nitride (TaN), niobium nitride (NbN) and tungsten nitride (WN). Examples of the carbon material having high conductivity may include Ketjen black, acetylene black, and graphite.

Note that if the amount of the conducting agent is not sufficient, the conductivity of the positive electrode cannot sufficiently be improved, while an excessive amount of a binder reduces the ratio of the positive electrode active material included in the positive electrode, and a high energy density cannot be obtained. Therefore, the amount of the conducting agent is in the range from 0% to 30% by weight relative to the entire positive electrode, preferably from 0% to 20% by weight, more preferably from 0% to 10% by weight.

Examples of a binder to be added in order to manufacture the positive electrode may include at least one selected from polytetrafluoroethylene, polyvinylidene fluoride, polyethylene oxide, polyvinyl acetate, polymethacrylate, polyacrylate, polyacrylonitrile, polyvinyl alcohol, styrene-butadiene rubber, and carboxymethylcellulose.

Note that if the amount of the binder is excessive, the ratio of the positive electrode active material contained in the positive electrode is reduced, and therefore a high energy density cannot be obtained. Therefore, the amount of the binder is from 0% to 30% by weight relative to the entire positive electrode, preferably from 0% to 20% by weight, more preferably from 0% to 10% by weight.

(2) Fabrication of Non-Aqueous Electrolyte

A non-aqueous electrolyte produced by dissolving an electrolyte salt in a non-aqueous solvent may be used.

Examples of the non-aqueous solvent may include a cyclic carbonate, a chain carbonate, esters, cyclic ethers, chain ethers, nitriles, amides, and a combination thereof, which are typically used as a non-aqueous solvent for a battery.

Examples of the cyclic carbonate may include ethylene carbonate, propylene carbonate, butylene carbonate, and any of the above having its hydrogen group partly or entirely fluorinated such as trifluoropropylene carbonate and fluoroethyl carbonate.

Examples of the chain carbonate may include dimethyl carbonate, ethyl methyl carbonate, diethyl carbonate, methyl propyl carbonate, ethyl propyl carbonate, methyl isopropyl carbonate, and any of the above having its hydrogen group partly or entirely fluorinated.

Examples of the esters may include methyl acetate, ethyl acetate, propyl acetate, methyl propionate, ethyl propionate, and γ-butyrolactone. Examples of the cyclic ethers may include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and a crown ether.

Examples of the chain ethers may include 1,2-dimethoxyethane, diethyl ether, dipropyl ether, diisopropyl ether, dibutyl ether, dihexyl ether, ethyl vinyl ether, butyl vinyl ether, methylphenyl ether, ethylphenyl ether, butylphenyl ether, pentylphenyl ether, methoxytoluene, benzylethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycoldibutylether, 1,1-dimethoxymethane, 1,1-diethoxyethane, trienthylene glycol dimethyl ether, and tetraethylene glycol dimethyl.

An example of the nitriles may include acetonitrile, and an example of the amides may include dimethylformamide.

The electrolyte salt may include substances excluding peroxides with high safety that are soluble to a non-aqueous solvent and selected from the group consisting of sodium hexafluorophosphate ($NaPF_6$), sodium tetrafluoroborate ($NaBF_4$), $NaCF_3SO_3$, NaBeTi, $NaC_4F_9SO_3$, $NaN(CF_3SO_2)_2$, $NaN(C_2F_5SO_2)_2$, $NaAsF_6$ and difluoro(oxalato) sodium borate, and the like. Note that one of the above electrolyte salts may be used or two or more of the above may be combined for use.

According to the embodiment, the non-aqueous electrolyte is produced by adding sodium hexafluorophosphate as the electrolyte salt in a concentration of 1 mol/l to a non-aqueous solvent produced by mixing ethylene carbonate and diethyl carbonate in the ratio of 30:70 by volume.

(3) Fabrication of Negative Electrode

According to the embodiment, a material capable of storing and releasing sodium ions is used. Example of such a material may include a sodium metal, a sodium alloy, a carbon material such as graphite, germanium, bismuth, and tin.

(4) Fabrication of Non-aqueous Electrolyte Secondary Battery

Using the above-described positive electrode, negative electrode, and non-aqueous electrolyte, a non-aqueous electrolyte secondary battery is produced as in the following paragraphs.

FIG. 1 is a schematic view for use in illustrating a test cell for a non-aqueous electrolyte secondary battery according to the embodiment.

As shown in FIG. 1, in an inert atmosphere, a lead is attached to the positive electrode 1 described above and a lead is attached to the negative electrode 2 for example of a sodium metal.

Then, a separator 4 is inserted between the positive electrode 1 and the negative electrode 2, and the positive electrode 1, the negative electrode 2, and a reference electrode 3 for example of a sodium metal are provided in a cell vessel 10. The non-aqueous electrolyte 5 is then injected into the cell vessel 10 to produce a non-aqueous electrolyte secondary battery as a test cell.

(5) Effects of Embodiment

According to the embodiment, the use of the positive electrode active material including sodium, nickel, manganese and a transition metal that can be in a hexavalent state allows reversible charge and discharge to be carried out and a non-aqueous electrolyte secondary battery can be provided less costly than the conventional non-aqueous electrolyte secondary battery.

INVENTIVE EXAMPLES (a) Inventive Example (a-1) XRD Measurement

A non-aqueous electrolyte secondary battery according to the above-described embodiment was produced. Now, the non-aqueous electrolyte secondary battery according to the inventive example will be described in detail.

As starting materials for a positive electrode active material, lithium carbonate ($Li_2CO_3$), nickel hydroxide ($Ni(OH)_2$), manganese carbonate ($MnCO_3$) and tungsten oxide ($WO_3$) were used.

In this example, the lithium carbonate, nickel hydroxide, manganese carbonate, and tungsten oxide were mixed in the molar ratio of 3:4:0.5:0.2. The powder for the positive electrode active material obtained by the mixing was formed in the shape of a pellet.

Then, the positive electrode active material was subjected to preliminary burning in an air atmosphere at 700° C. for 10 hours, followed by main burning in an air atmosphere at 800° C. for 20 hours.

Then, the positive electrode active material obtained by the main burning was measured using an XRD (X-ray diffraction device).

FIG. 2 is a graph showing the measurement result of XRD measurement carried out to the positive electrode active material. Note that during the XRD measurement, the positive electrode active material was enclosed in a plastic bag so that the positive electrode active material was kept from being in contact with the air.

It was found from the result of XRD measurement shown in FIG. 2 that the positive electrode active material obtained by the main burning had a crystal system that belonged to the space group R-3m similarly to that of $LiNiO_2$.

(a-2) Fabrication of Test Cell

Then, a positive electrode material was obtained by mixing 80 wt % of the above-described positive electrode active material, 10 wt % acetylene black as a conducting agent, and 10 wt % polyvinylidene fluoride as a binder.

The positive electrode material was mixed into a 10 wt % N-methyl-2-pyrrolydone solution to produce slurry as a positive electrode mixture. Then, the produced slurry was applied on an aluminum foil as a positive electrode collector by the doctor blade method, followed by drying in vacuum at 110° C., so that a positive electrode active material layer was formed. A positive electrode tab was attached onto the region of the aluminum foil where the positive electrode active material layer was not formed, so that a positive electrode 1 was obtained. Lithium metal pieces having prescribed sizes are used for a negative electrode 2 and a reference electrode 3.

The non-aqueous electrolyte 5 was produced by adding lithium hexafluorophosphate as an electrolyte salt in a concentration of 1 mol/l to a non-aqueous solvent produced by mixing ethylene carbonate and diethyl carbonate in the ratio of 30:70 by volume.

Using the above-described positive electrode 1, the negative electrode 2, the reference electrode 3, and the non-aqueous electrolyte 5, a non-aqueous electrode secondary battery as a test cell was produced according to the embodiment (FIG. 1).

(a-3) Carrying out Charge/Discharge Tests

In the non-aqueous electrolyte secondary battery produced as described above, two cycles of charge and discharge were performed (from the first cycle to the second cycle). In each cycle, charging at a constant current of 0.1 It was carried out until the potential of the positive electrode 1 with reference to the reference electrode 3 reached 5.0 V, and then discharging was carried out until the potential reached 2.5 V. Note that a current value obtained when rated capacity is completely discharged within one hour is called "rated current," which is represented as 1.0 C. this is represented as 1.0 It according to the SI (System International) unit system.

Thereafter, charging was carried out until the potential reached 5.0 V (charging in the third cycle). In this way, the positive electrode 1 had lithium ions released.

Then, the positive electrode 1 having the lithium ions released was taken out of the test cell and washed three times with diethylene carbonate.

Then, using the washed positive electrode 1, a negative electrode 2 of a sodium metal having a prescribed size, a reference electrode 3 of a sodium metal, and a non-aqueous electrolyte 5, a non-aqueous electrolyte secondary battery as a test cell was again produced according to the embodiment described above (FIG. 1). Note that the non-aqueous electrolyte 5 was produced by adding sodium hexafluorophosphate as an electrolyte salt in a concentration of 1 mol/l to a non-aqueous solvent produced by mixing ethylene carbonate and diethyl carbonate in the ratio of 30:70 by volume.

In the non-aqueous electrolyte secondary battery produced as described above, discharging was carried out until the potential of the positive electrode 1 with reference to the reference electrode 3 reached 1.5 V at a constant current of 0.1 It (discharging in the third cycle). Thereafter, three cycles of charging and discharging were performed (from the fourth cycle to sixth cycle). In each cycle, charging was carried out until the potential of the positive electrode 1 with reference to the reference electrode 3 reached 4.5 V, and then discharging was carried out until the potential reached 1.5 V.

In this way, it was examined whether the positive electrode active material in this example could reversibly store and release sodium ions, and whether the non-aqueous electrolyte secondary battery using the positive electrode active material could be charged and discharged.

(b) Evaluation of Inventive Example

Measurement values for the charge and discharge specific capacities obtained as the result of charge and discharge tests are given in Table 1. The charge and discharge characteristics of the non-aqueous electrolyte secondary battery according to the inventive example are given in FIGS. 3 and 4.

TABLE 1

| cycle number | charge/ discharge state | electrolyte salt used | specific capacity [mAh/g] |
| --- | --- | --- | --- |
| 1st cycle | charge | lithium hexafluorophosphate | 276 |
|  | discharge | lithium hexafluorophosphate | 200 |
| 2nd cycle | charge | lithium hexafluorophosphate | 205 |
|  | discharge | lithium hexafluorophosphate | 195 |
| 3rd cycle | charge | lithium hexafluorophosphate | 199 |
|  | discharge | sodium hexafluorophosphate | 183 |
| 4th cycle | charge | sodium hexafluorophosphate | 228 |
|  | discharge | sodium hexafluorophosphate | 177 |
| 5th cycle | charge | sodium hexafluorophosphate | 188 |
|  | discharge | sodium hexafluorophosphate | 173 |
| 6th cycle | charge | sodium hexafluorophosphate | 180 |
|  | discharge | sodium hexafluorophosphate | 163 |

Figure 3:
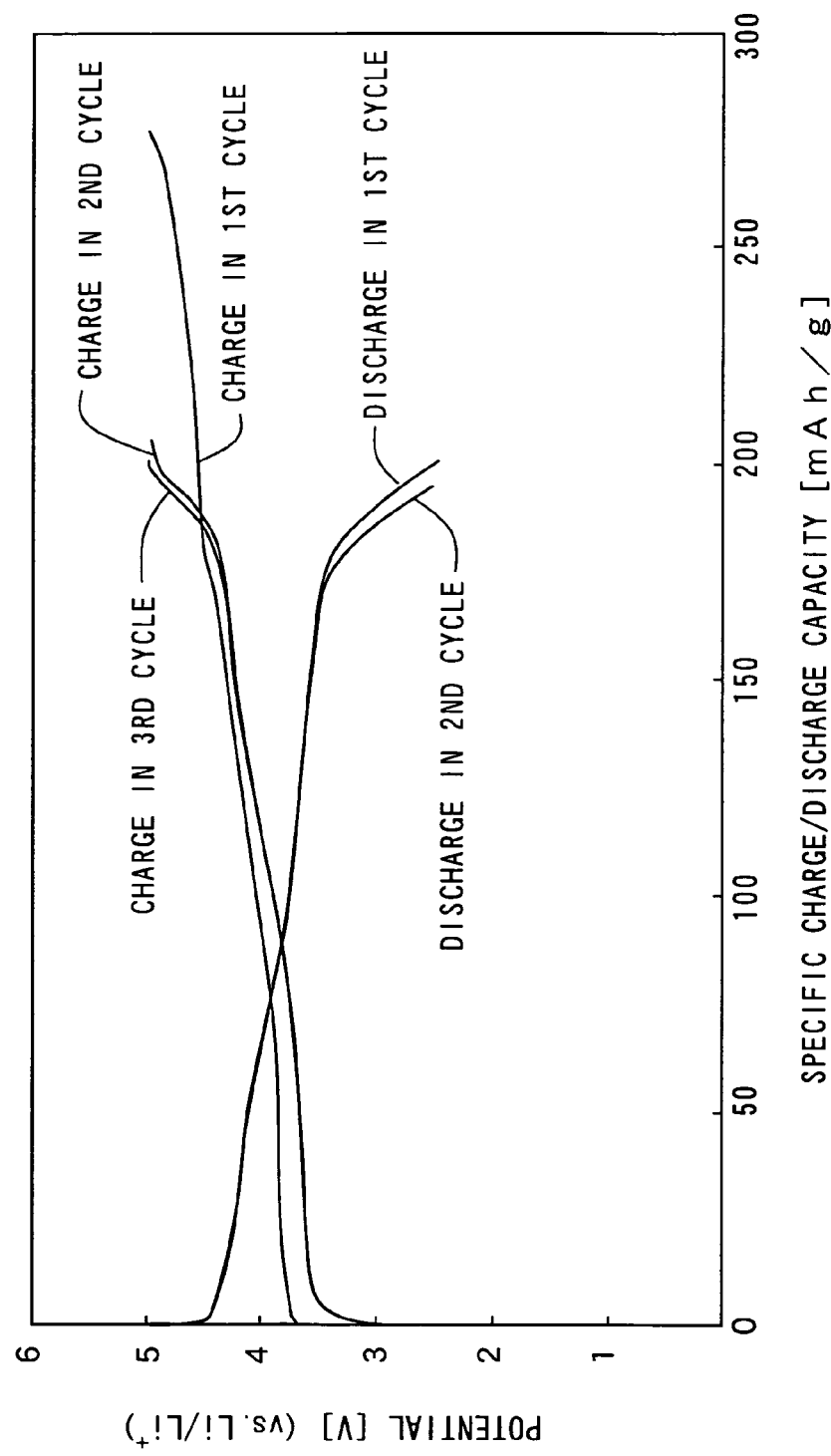
FIG. 3 is a graph showing the charge/discharge characteristic of the non-aqueous electrolyte secondary battery according to an example.
Figure 4:
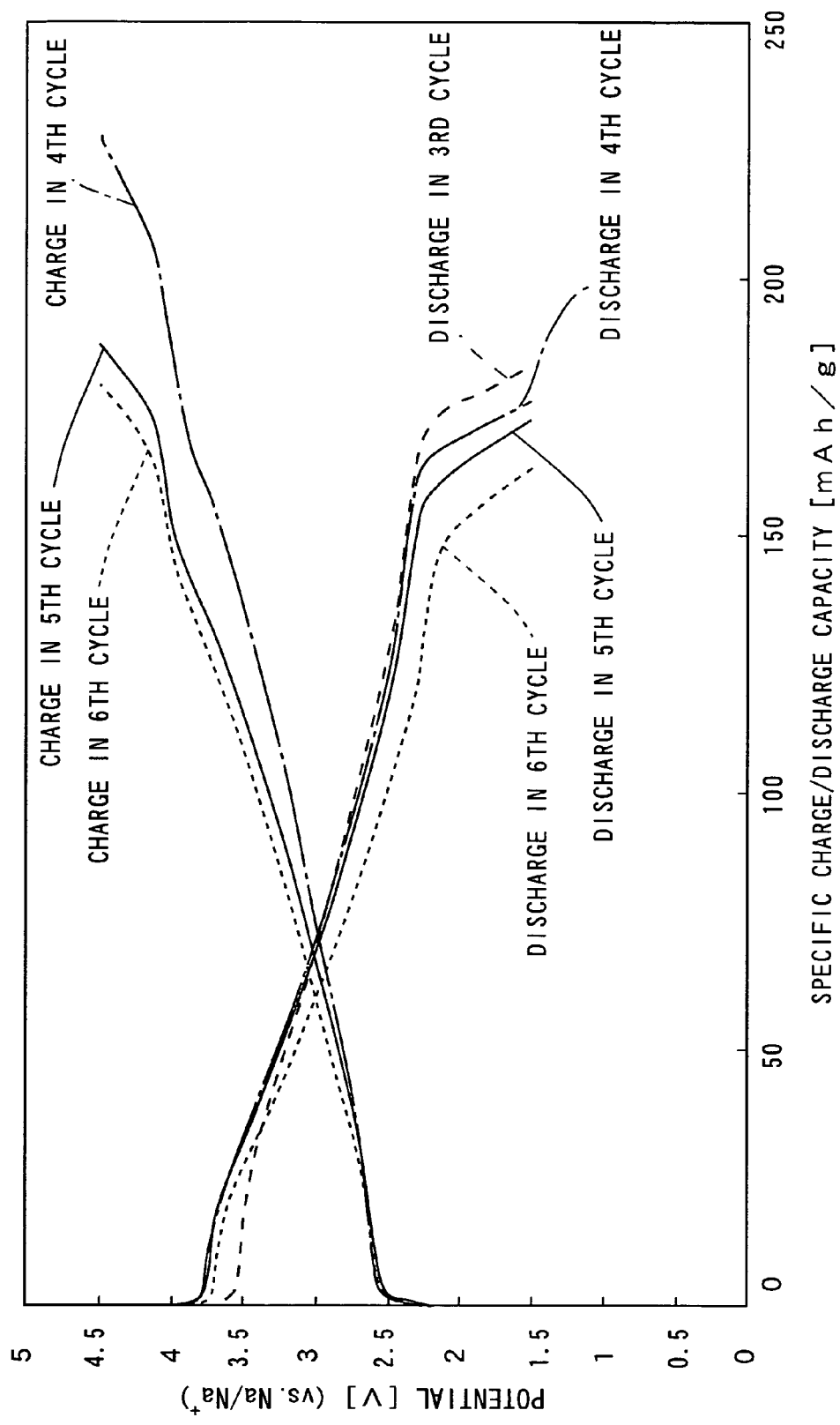
FIG. 4 is a graph showing the charge/discharge characteristic of the non-aqueous electrolyte secondary battery according to an example.

As can be understood from Table 1 and FIGS. 3 and 4, good charging and discharging was carried out.

More specifically, it was clearly shown that sodium ions were reversibly stored and released to and from the positive electrode 1. Therefore, the advantage of the new non-aqueous electrolyte secondary battery over the conventional non-aqueous electrolyte secondary battery was confirmed.

INDUSTRIAL APPLICABILITY

The non-aqueous electrolyte secondary battery according to the invention may be applied as various kinds of power supplies such as a power supply for a mobile phone and an automotive power supply.

The invention claimed is:

1. A non-aqueous electrolyte secondary battery, comprising:
   a positive electrode including a positive electrode active material and capable of reversibly storing and releasing sodium ions during discharge and charge respectively, the ions being derived from said positive electrode active material;
   a negative electrode capable of storing and releasing sodium; and
   a non-aqueous electrolyte,
   wherein said positive electrode active material contains sodium, nickel, manganese, and tungsten, and
   wherein said positive electrode active material includes a crystal structure that belong to a space group R-3m.

2. The non-aqueous electrolyte secondary battery according to claim 1,
   wherein the composition of said positive electrode active material is represented by the molar ratio of the total of sodium (Na) and lithium (Li), nickel (Ni), manganese (Mn), and tungsten (W) as (Na+α Li):Ni:Mn:W=x:4:y:z, where said x is from 4 to 12, said y is from 0.1 to 1.5, said z is from 0.1 to 1.5, and said α is at least 0 and less than 1.

3. The non-aqueous electrolyte secondary battery according to claim 1,
   wherein the non-aqueous electrolyte includes one or more selected from the group consisting of a cyclic carbonate, a chain carbonate, esters; cyclic ethers, chain ethers, nitriles, and amides.

4. A non-aqueous electrolyte secondary battery according to claim 1, wherein the non-aqueous electrolyte contains sodium ions.

5. A non-aqueous electrolyte secondary battery, comprising;
   a positive electrode including a positive electrode active material and capable of reversibly storing and releasing sodium ions during discharge and charge respectively, the ions being derived from said positive electrode active material;
   a negative electrode capable of reversibly storing and releasing sodium ions during charge and discharge respectively; and
   a non-aqueous electrolyte,
   wherein said positive electrode active material contains sodium, nickel, manganese, and tungsten, and
   wherein said positive electrode active material includes a crystal structure that belong to a space group R-3m.

* * * * *